June 14, 1932.  E. E. LITTLEFIELD  1,862,937
VALVE AND ITS OPERATION
Filed Sept. 2, 1925
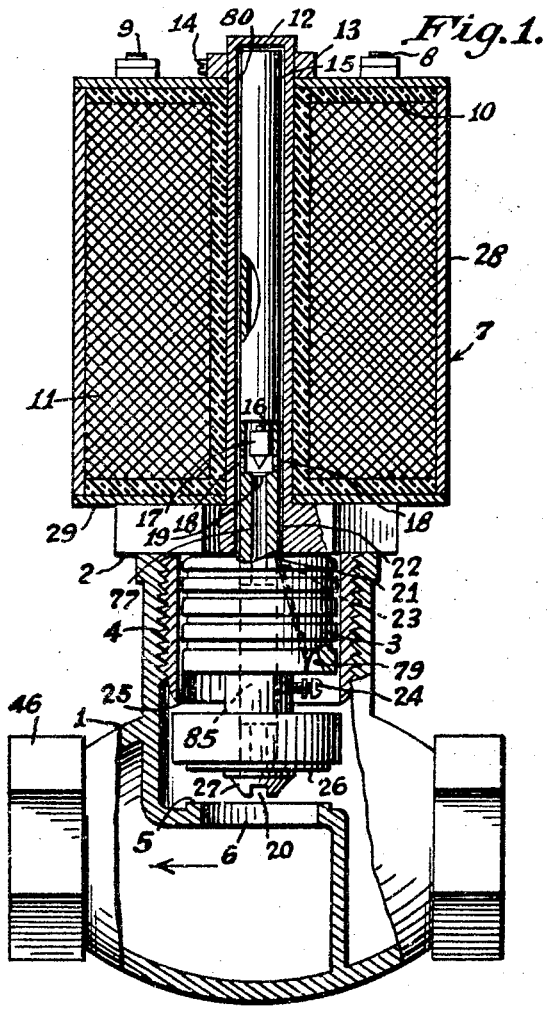
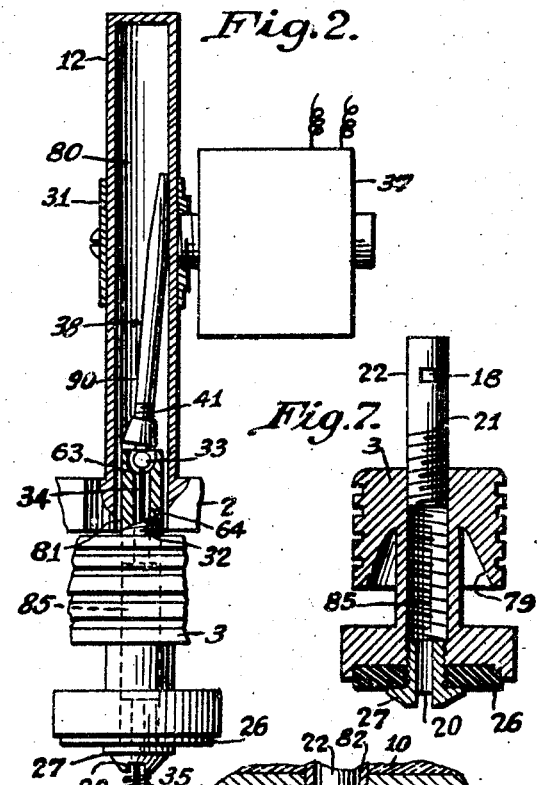
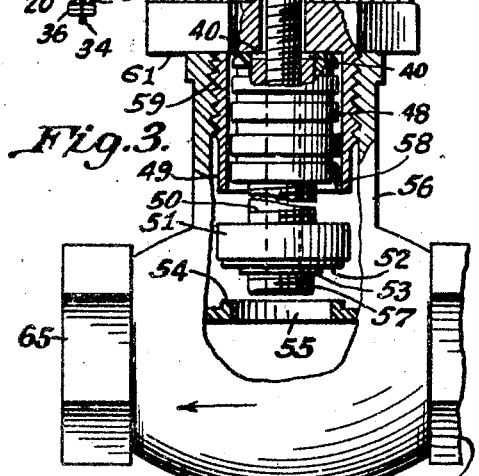
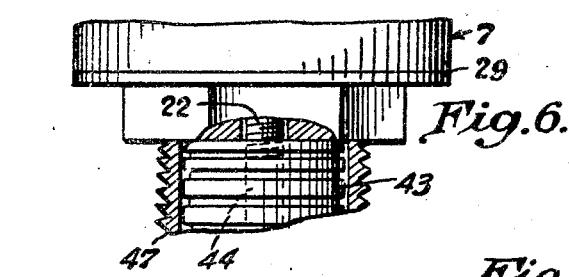
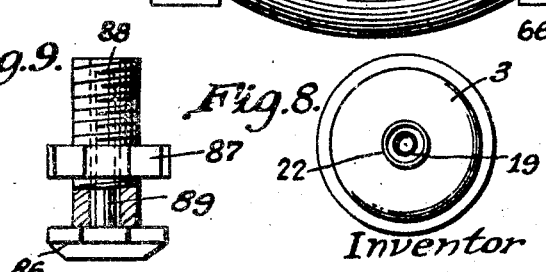
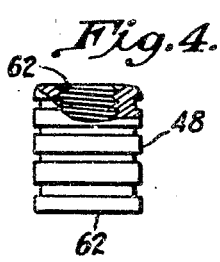
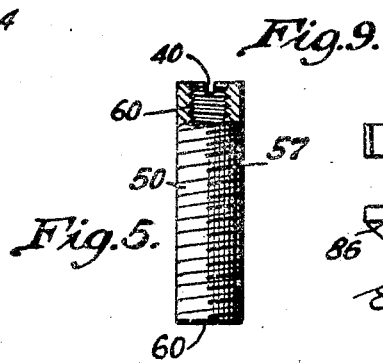
Inventor
Edgar Earl Littlefield Patented June 14, 1932

1,862,937

UNITED STATES PATENT OFFICE

EDGAR EARLE LITTLEFIELD, OF LOS ANGELES, CALIFORNIA

VALVE AND ITS OPERATION

Application filed September 2, 1925. Serial No. 54,080.

Briefly considered this invention relates to improvements in valves designed to function on either alternating or direct current. It is also directed to improvements having for their object the control of various fluids supplied under different or varying pressure conditions.

Another object of the invention is to provide a device which is economical in power consumption and which will function on low voltage.

Another object is to provide a quick acting valve that will not stick and that will seat without an objectionable hammer blow.

Another object is to provide a device, and control therefor, answering ordinary safety requirements.

Another object is to provide suitable controlling means employing preferred methods of operation.

Another object is to provide a valve the cost of which will permit of its adoption and use generally.

Another object is to provide a valve the parts of which are not subjected to unnecessary strain or wear.

Another feature resides in the adjustability of certain elements making up the combination.

Other objects and advantages of my invention, in addition to compactness of assembly, economy in manufacture and installation, reliability of operation, the advantage of few moving parts, low consumption of current, low voltage operation, and delicacy of operation, should be readily appreciated as the invention becomes better understood by reference to the following description when considered in connection with the accompanying drawings.

Referring to the drawings:

Fig. 1 is a side elevation, partially in vertical section, of one embodiment of my invention.

Fig. 2 is a view, partly in sectional elevation, of a modified embodiment of the invention shown in Figure 1.

Fig. 3 is a view of a side elevation, partially in vertical section, illustrating one manner in which certain elements of the combination of Fig. 1 may be incorporated in a valve of a different size.

Fig. 4 is a detail view, partially in section, of the element 48, of Fig. 3.

Fig. 5 is a detail view, partially in section, of the element 50 of Fig. 3.

Fig. 6 is a view, partially in sectional elevation, showing certain elements of the combination of Fig. 1 incorporated in a valve of a size larger than that of either Fig. 1 or Fig. 3.

Fig. 7 is a detail sectional view of the plunger 3, of Fig. 1, showing one manner of connecting the parts 22 and 3, together with other details.

Fig. 8 is an upper face view of the combination shown in Fig. 7.

Fig. 9 shows an adjusting means for certain of the devices.

In the various views like numerals refer to like elements.

Referring to the drawings more in detail and particularly to Fig. 1, in which the arrow indicates the direction of fluid flow, reference character 1 indicates a valve body having inlet and outlet openings 45 and 46 and a port 6 provided with a seat 5 adapted to co-act with a closure 3. A gasket 26, of any suitable material, is detachably secured, by means of a tubular bolt 27, to the lower end of closure 3. The material of the gasket may be varied to correspond to the pressure and nature of the fluid. In controlling a fluid such as gasoline I have found cork a suitable material. The closure 3 is preferably formed with a petticoat or flange 79 although I have found that in numerous cases it may be omitted. At 23 a small duct is shown as extending through one side of the closure and which serves to permit fluid to enter the chamber 80 above the closure. In actual practice, however, it has been found that in most cases sufficient fluid enters the space above the closure around the same which makes it possible in such cases to omit the small duct. To permit fluid above the closure to escape, the threaded bolt 27 is provided with a larger duct 20. The body of closure 3 forms a threaded passage 85 into the upper end of which is detachably mounted a tubular element 22 having a duct 77 at the upper end of which is a valve seat 19. Ports 18 in the side walls of element 22 permit fluid to enter the duct 77 while threads 21 permit proper assembling of the devices. A magnetizable element 17, forming an auxiliary valve, controls the duct 77. Instead of detachably assembling the parts 3 and 22 the latter may, as desired, consist of an extension of the closure 3 in which case it would form an integral part of the latter. The arrangement, however, is optional. To adjust the flow of fluid through the passage or by-pass formed by the parts 3, 27 and 22 an adjusting screw, or the like, shown at 24, is arranged in any convenient manner. The part 22 is, preferably, nonmagnetic. An extension 12 of a cap 2 forms a tubular element closed at the top but open at its lower end to permit fluid to enter the recess 80 formed thereby. An annular exteriorly-threaded flange 4 integral with cap 2 forms a cylinder within which the piston of closure 3 reciprocates, the threads formed by the flange detachably securing the cap to the valve neck. Instead of forming an integral part of the cap 2 the part 12 may consist of a separate piece screwed into the cap. Preferably, the element is non-magnetic. Within the recess 80 I have arranged a magnetizable armature 15 which is carried by and rests loosely on element 22 the former having a magnetic separator 16, of the usual type, for preventing sticking between the armature and auxiliary valve. Obviously, the auxiliary valve is magnetizable. While I have shown the part 15 as resting freely upon the upper end of element 22 it is evident that in certain cases the two elements may be adjustably united. The solenoid casing consists of a tubular iron sleeve 28 and two head pieces in the form of washers 29 and 30 arranged as shown. Within this casing a spool 10, carrying a winding 11 is so arranged as to be easily removed upon releasing the set screw 14 which clamps the ring 13, together with the head piece or washer 30, in place. Elements 8 and 9 form binding posts for the coil terminals. My method of forming and assembling the solenoid parts facilitates removal for replacement or repair and constitutes an improvement which not only reduces the cost of construction but links interchangeability of parts with valves of different size with other features in a manner answering many commercial requirements. From what follows, as well as from what has already been said, it will be found that numerous elements of the various designs of the invention are interchangeable. It will not be difficult to appreciate this feature from a practical standpoint. Instead of the adjusting means 24 other means may be substituted therefor. For instance, the device shown in Fig. 9, which will be described later, may be substituted for the screw 27.

Assume that the valve is connected to a source of fluid, such as water for instance, at a pressure corresponding to requirements, and that the device is in closed position. In this position the part 15 has followed the tubular element in its downward travel and rests freely on its upper end. In this position it will when energized attract the magnetizable element forming the auxiliary valve 17 thus opening the by-pass 77. The part forming the needle valve of the element 17 may be formed of brass while the armature part of the same may be formed of iron such as is commonly employed for such purposes. Another construction consists in forming the auxiliary valve as a whole from a piece of stainless iron. This simplifies the construction and eliminates, in many cases, the necessity for plating or coating with copper or nickel to prevent corrosion. Instead of giving this auxiliary valve the form shown it may consist, in some cases, of a ball of stainless iron or a ball of the usual soft iron which has been coated to avoid corrosion. For controlling a fluid such as air, for instance, it will be apparent that corrosion will result only in exceptional cases consequently in only such cases will it be necessary or desirable to coat or plate the element. In order to permit the required amount of fluid to enter the by-pass 77 the ports 18 in the wall of the part 22 should be sufficiently large. In ordinary cases the capacity should correspond to the capacity of the said by-pass. However, it will be understood that the capacity of the ports or by-pass may be varied to answer requirements. In the above position of the valve the pressure of the line fluid is against the upper part of the closure while the position of auxiliary valve 17 and closure 3 would be such as to close the ports 77 and 6 it being assumed that the adjusting screw 24 is properly set. Upon applying a suitable energizing current to the solenoid 7 the auxiliary valve 17 will be attracted by the armature 15 thus unseating the needle valve and opening the port 77 from which the fluid now flows through the continuation of the passage formed by the elements 3 and 27. Since the area of the upper end of the closure is greater than that of the lower end when the latter is seated the releasing of the pressure from the upper end, caused by the escaping fluid, will force the closure up in the valve chamber thus opening the valve. The closing of the valve is, of course, just the reverse of this operation. This valve in substantially the form shown has been employed for controlling fluids such as air and water at pressures ranging from 5 to 200 pounds. This statement, however, is not intended as defining the limits of the device. While I have not found it necessary to give particular consideration to the weight of the parts 15, 17 and 22 it is evident that the walls of the parts 15 and 22 may be considerably reduced in thickness while the weight of the auxiliary valve may be reduced in any convenient manner if a more sensitive operation is desired. However, it is not believed that such expedients will become necessary except in unusual cases. By adjusting the screw member 24, or any suitable substitute therefor, it will be found that the valve may be employed under many different pressure conditions. Due to the fact that the magnetizable member forming the auxiliary valve 17 is relatively light in weight and since, in operating the device, it is necessary only to open the port 77, controlled by the auxiliary valve, it will readily be seen that a small amount of current will operate it. Obviously, the armature 15 is carried upward by the part 22 when the closure rises. I have employed the above valve for controlling such fluids as air, water, and steam under many different conditions and find it very sensitive and reliable in operation. Due to the small amount of current required it will not overheat under continuous service conditions. As is well known the overheating of valves is a serious objection and in many cases prevents their adoption and use. The valve will function on either alternating or direct current at low voltages and low current values. It will operate on the current supplied by two or three dry cells or on the current derived from a 50 to 75 watt transformer at from 15 to 25 volts. Due to one or another of the above features it forms a desirable and suitable substitute for valves the installation of which is more expensive and require, in addition, underwriter inspections, fees, etc. Due to its simplicity of construction it can be made at low comparative cost with a great saving to the user.

In Fig. 2 I have shown a modified embodiment of the invention illustrated in Fig. 1. From this view I have omitted the valve body 1 although it is assumed to be present. Instead of employing the elements 15, 16, 17 and 22 I have substituted therefor a modified control for the closure 3 the valve in other respects being a counterpart of the valve of Fig. 1 except that the electro-magnetic energizing means external to the valve chamber is of modified construction. In this design of the valve I have substituted for the adjustable element 22, by means of threads 32, a tubular element 81 having a by-pass duct 64 provided with a seat 63. Co-acting with this seat is a magnetizable ball valve 33 secured, detachably if desired, to a pin 34 forming a guide for the valve and co-acting otherwise as explained below. By passing this stem through the by-pass and resiliently and detachably securing the other end, as by means of detachable threaded nuts 36 and a detachably mounted tensioning spring 35, the valve 33 is not only guided to its seat but its capacity to seat itself under varying service conditions is increased. In actual practice it has been found that a very small valve, when assembled in the manner indicated, will not only readily find its seat but the amount of current necessary for operation is, at the same time, reduced to a minimum. Loosely mounted on the upper end of element 81, in position to attract the auxiliary valve 33, is a tiltable arm or armature 38 consisting, in part, of a magnetizable rod 90 having threads 41 by means of which a co-acting brass sleeve or collar 39 is adjustably positioned by means of companion threads. Detachably and adjustably mounted, as by means of a brass sleeve 31; to the tubular element 12, in position to attract the arms 38, is an electro-magnet 37 the position of which on the tubular element 12 may be adjusted by the detachably mounted securing means. To overcome the effects of corrosion it is preferable to coat the magnetizable elements inside the valve chamber with corrosion resisting substance such as copper or nickel. However, in numerous cases the elements themselves may be formed of stainless iron.

Assuming that the valve is connected to a suitable source of fluid and that an energizing current is applied to the electro-magnet 37 the elements will assume the position shown, the arm 38 being tilted toward the electro-magnet while, due to magnetism applied to the rod 90, the valve 33 will be unseated, thereby unsealing the by-pass 64. As previously explained with reference to he valve of Fig. 1 the releasing of the hydrostatic pressure from above the closure 3 causes the latter to move upward in the valve chamber thus opening the valve. De-energizing the electro-magnet of course causes the arm or armature 38 to assume its normal position in the central part of the tubular element 12. Since de-energizing the electro-magnet results in de-energizing the rod 90 it is apparent that the valve 33 will be released and drop to its seat, thus closing the by-pass 64 and causing pressure to accumulate above the closure 3 thereby closing the valve.

While I have illustrated and described a specific means for unseating the auxiliary valve 33 it is apparent that other means may be employed. For instance, a hook and eye connection, or the equivalent thereof, between the arm 90 and valve 33 would form a suitable substitute. By detachably securing or assembling the elements 33, 34, 35 and 36 I have made replacement and repair easy and have also made it possible to substitute these elements for the auxiliary valve in the structure of Fig. 1. In other words, if the valve 17 of Fig. 1 is removed and the ball valve 33, together with the stem 34 nuts 36 and spring 35, are assembled in the device of Fig. 1 in the manner shown in Fig. 2 the element 15 would constitute an armature for unseating the valve 33. Furthermore, since the electromagnet 37 is detachable it is apparent that it, together with the elements which it controls, may be substituted for the movable elements, together with the energizing means, shown in Fig. 1.

In Fig. 3 I have shown a valve body having the design of that shown in Fig. 1 the only difference being that the former is designed to answer requirements for a smaller size valve. Although not shown in full the electro-magnetic controlling mechanism external to the valve chamber is assumed to be present and constitutes a counterpart of that of Fig. 1. Elements 15 and 17, also, are assumed to be present and, together with the device 22, are interchangeable with those of Fig. 1. To accommodate a smaller closure, including elements 48, 50 and 51, the cylinder 58, formed by annular flange 49, is less in diameter than cylinder 25 otherwise the cap 61, which is detachably secured to the valve body 56 by means of threads 59, together with element 82, are counterparts of those shown in Fig. 1 and may be formed and assembled in an analogous manner. The flow of fluid is from inlet opening 66 in the direction of the arrow through a port 55, having a seat 54, to outlet opening 65. A gasket 52, of any suitable material, co-acts with seat 54 and is detachably mounted, by means of threads thereon and a locking screw-threaded nut 53, on an interiorly and exteriorly threaded tubular element 50. The manner of assembling, obviously, affords opportunity for adjustments. By detachably and adjustably securing the exteriorly-flanged interiorly-threaded piston element 48 on the common tubular element 50 it is possible to effect various adjustments. Such adjustability renders the valve much more flexible under the various service conditions to which it will be subjected. In one case this element 48 may serve to regulate the flow of fluid to the chamber above the closure as by controlling the flow of fluid through the grooves 40 formed on the upper end of element 50 and, in turn, the flow through the by-pass 77. The method of assembling, above described, facilitates removal for replacement or repair and generally gives the valve a flexibility not found in prior art devices. Such features as those which permit differences in thickness of gaskets to be taken up and adjustments between related parts, such as the parts 48 and 51, whereby the action of the line pressure may be varied, will be readily appreciated. For adjusting purposes a bolt 86, shown in Fig. 9, having longitudinal slots 89 and constituting a tubular element closed at one end by means of its head may be inserted into the lower end of element 50 and adjustably positioned by means of threads 88 and lock nut 87 whereby the flow is regulated through the longitudinal slots 89. Screw threads 88 on the bolt co-act with the threads at the lower end of element 50. A nut 87, co-acting with the threads on the bolt, permits various adjustments by means of which the flow of fluid through the bore 60 may be regulated. In certain cases the device of Fig. 9 may form a convenient substitute for the screw 27. Instead of the adjusting means just described other means may be substituted therefor. For instance, the member 50 may be so designed as to permit incorporation therewith of the adjusting means 24. Element 50 may be of any required dimensions which, of course, would require correspondence between the various elements making up the whole. A comparison of the device of Fig. 3 with the device of Fig. 1 will show that a closure combination including the elements 3, 24, 26 and 27, in size corresponding to the size of the valve shown in Fig. 3, may, if desired, be substituted for the closure including the elements 48, 50, 51, 52 and 53.

Fig. 4 is a side elevation, partially in section, of the device 48. As indicated previously the threaded longitudinal bore 62 provides means for adjustably and detachably securing the device to element 50.

In Fig. 5 I have added a side view, partially in section, of the device 50 which, as previously described, is provided with threads 57 adapted to co-act with those of elements 48, 51 and 53. Grooves 40 extend through the side walls at the upper end.

In Fig. 6 I have illustrated how certain elements forming the combination shown in Fig. 1 may form elements interchangeable with those of a larger size valve of the same type. In other words the devices are identical except that certain dimensions of the elements forming the closure, as well as the diameter of the cylinder formed by the annular flange, are so designed as to accommodate a larger valve body, while the diameter and threads of the bore 44, formed by the piston element 43, are substantial counterparts of those shown in Fig. 1. As indicated previously, the cap 42 is a substantial counterpart of cap 2 except that the flange formed thereby is designed to accommodate a closure of greater diameter.

In Fig. 7 I have, for the sake of brevity, omitted certain features, otherwise it shows a side elevation, partly sectional, of the closure combination of Fig. 1.

Fig. 8 is an upper face view of the arrangement shown in Fig. 7.

In carrying the various embodiments of my invention into practice I have found it preferable to use an auxiliary valve the weight of which is less than fifty per cent of the combined weight of the closures. I also prefer to have it displace less fluid than the valve it controls.

While in the foregoing I have illustrated and described typical forms of preferred embodiments whereby my invention may be carried into practice it will be understood that many modifications in the structure employed, as well as in the elements themselves, and in the application thereof, may be made without departing from the scope of the appended claims.

This application contains subject matter common to applications Serial #4,102, filed January 22, 1925; Serial #544,878, filed March 18, 1922 resulting in Patent Number 1,633,217 and Serial #328,305, filed Oct. 3, 1919.

I claim as my invention:

1. A combination including a valve casing having inlet and outlet openings; a seat arranged to support the weight of a closure within said casing; a closure co-operating with said seat, said closure having a by-pass; an electrically energized controlling member for said closure, said member forming an auxiliary valve; means movable by the fluid controlled by said valve for electrically energizing said member; energizing means for said fluid movable means, said energizing means being supported independently of the auxiliary valve.

2. A combination including; a valve body having an imperforate part of its wall forming a recess; a closure having a by-pass; means co-acting with said recess to control communication through said by-pass, said means including an auxiliary valve supported by said closure in its open position; electrical means without said recess adapted to inductively control said auxiliary valve.

3. A valve combination including a valve casing having a pressure chamber open to line pressure when the valve is closed; a seat within said chamber arranged to support the weight of a closure; a closure within said chamber the weight of which is supported by said seat; a movable electrically energized member controlling said closure, said member forming an auxiliary valve; means movable with said member for energizing the latter; a control for said means.

4. A valve mechanism including a casing having a pressure chamber open to line pressure when the valve is closed; an armature within said chamber; an auxiliary valve controlled by means of said armature; a closure controlled by means of said auxiliary valve, the armature being supported by the closure in the open position of the latter; electrical controlling means for the armature.

5. A valve mechanism including a casing having an imperforate part of its wall forming a chamber; an armature within said chamber; an auxiliary valve controlled by means of said armature; a closure controlled by means of said auxiliary valve, the auxiliary valve being supported by means of the closure in the open position of the latter; electrical controlling means for the armature.

6. A combination including a valve casing; a closure within said casing, said closure having a by-pass; an electrically controlled auxiliary valve controlling communication through said by-pass; controlling means for the auxiliary valve including an element supported by the fluid controlled by said valve when the closure is in open position; controlling means for said element including a stationary winding.

7. In the operation of a valve of the type having a chamber open to line pressure when the valve is closed and in which chamber a movable armature, an auxiliary valve, and an auxiliary-controlled valve are assembled in one position when the valve is closed, the method which consists in unseating the auxiliary valve by means of the armature and utilizing the auxiliary-controlled valve to cause the armature to assume another position in said chamber.

8. A combination including a valve casing having a chamber open to line pressure when the valve is closed; an electrically controlled auxiliary valve and an auxiliary-controlled valve within said chamber, the latter valve having a by-pass controlled by means of the auxiliary valve; a guide for the auxiliary valve supplied by the auxiliary-controlled valve; electrical energizing means for the auxiliary valve.

9. A combination including a valve body having a seat; an auxiliary-controlled valve adapted to co-act with said seat, said valve having a by-pass; an adjustable member having a duct coacting with the by-pass of said valve; an electrically controlled auxiliary valve controlling the by-pass the auxiliary-controlled valve supporting the auxiliary valve; electrical controlling means for the auxiliary valve.

10. A combination including a valve casing having a seat; a closure co-acting with said seat; an electrically controlled auxiliary valve controlling said closure; resilient means co-acting with said closure to cause the auxiliary valve to re-seat after it is unseated; electrical controlling means for the auxiliary valve.

11. A combination including a valve body having an imperforate part of its wall forming a recess; an armature movable in said recess; means for projecting a magnetic field into said recess for actuating said armature, the path of the armature intersecting the path of the magnetic flux where the latter passes through the wall of the recess; an auxiliary valve controlled by said armature; and a closure controlled by said auxiliary valve, the closure forming a support for the auxiliary valve when the latter is in open position.

12. A combination including a valve body having an imperforate part of its wall forming a recess; an adjustably positioned auxiliary valve co-acting with said recess; a closure controlled by said auxiliary valve; controlling means for the auxiliary valve.

13. A combination including a valve body having an inlet and a main outlet opening; means controlling communication between said openings including an electrically controlled normally-closed auxiliary valve for by-passing fluid to said outlet-opening and an auxiliary controlled valve, the former being supportable by the latter when both valves are in open position.

14. A valve structure including a casing having a chamber open to line pressure when the valve is closed; a closure within said chamber, said closure having a by-pass with a valve seat at one end thereof; an auxiliary valve the weight of which is supported by said seat; an armature controlling the auxiliary valve, the armature being supported by the closure in the open position of the latter.

15. A valve structure including a casing having a seat arranged to support the weight of a closure; a closure the weight of which is supported by said seat; an armature supported by the closure in the open position of the latter; an auxiliary valve controlled by the armature and movable independently thereof until it has assumed an open position.

16. A valve structure including a casing having a pressure chamber with a seat arranged to support the weight of a closure; a closure within said chamber the weight of which is supported by said seat, said closure having a by-pass; an auxiliary valve; an armature controlling the auxiliary valve, the armature being supported by the closure in both the open and closed positions of the latter.

17. In the operation of a valve of the type in which an armature and an auxiliary valve co-operate to control release of pressure from a pressure chamber to thereby control a second valve, the weight of which is supported by a seat within said chamber, the method which consists in utilizing the armature to control the operation of the auxiliary valve and utilizing the second valve to control the position of the armature.

18. In the operation of a valve of the type having a pressure chamber open to line pressure when the valve is closed and in which chamber an armature and an auxiliary valve co-operate to control a second valve, the method which consists in supporting the auxiliary valve by means of the second valve in the open and closed positions of both valves.

19. A valve structure including a casing having a pressure chamber with non-collapsible walls; means for releasing pressure from the chamber including an auxiliary valve; a second valve controlled by the auxiliary valve, said valves being so arranged as to displace fluid controlled thereby, the auxiliary valve displacing less fluid than the second valve, the auxiliary valve in its open position being supported by the second valve; electrical means forming part of the pressure chamber for controlling the auxiliary valve.

20. A valve structure including a casing having a pressure chamber therein; means for releasing pressure from the chamber including an auxiliary valve; a second valve controlled by the auxiliary valve, said valve having a by-pass with a seat for the auxiliary valve, the seat supporting the weight of the auxiliary valve, the auxiliary valve in its open position assuming a plurality of positions under control of the second valve; an outlet opening common to the fluid controlled by both of said valves.

21. A valve structure including a casing having a pressure chamber with a seat arranged to support the weight of a main valve; a main valve within said chamber the weight of which is supported by said seat, said valve having a by-pass; an auxiliary valve the weight of which is less than that of the main valve, the auxiliary valve controlling said by-pass and being supported in its open position by the main valve.

22. A valve combination including a valve body having a seat; a closure co-acting with said seat, said closure having a by-pass within the area defined by said seat; a main outlet opening for said valve with which the by-pass is in communication; an auxiliary valve controlling said by-pass; independently adjustable regulating means detachably mounted on said closure within said area.

23. A combination including a valve body having a seat and a main outlet opening; a closure co-operating with said seat, said closure having an outlet opening within the area defined by said seat in communication with said main outlet opening; an auxiliary valve controlling the outlet of said closure; independently adjustable regulating means detachably mounted on said closure within said area.

24. In the operation of a valve having a valve member and a plurality of reciprocating armatures one of which, at least, is movable in a path common to another armature the step which consists in utilizing the fluid controlled by the valve member to control the position of the armatures after communication through the valve is established.

25. A valve combination including a valve member and a plurality of movable armatures one of which, at least, is movable in a path common to more than one armature and so arranged that during the operation of the valve the distance between the armatures is varied to control the position of the valve member.

26. A combination including a valve casing having a closure therein provided with a by-pass, said by-pass having a seat; an auxiliary valve the weight of which at times is supported by said seat; a controlling movable armature supported independently of the auxiliary valve when the latter is seated, said armature and said seat being spaced at a fixed distance from each other; electrical controlling means for said armature.

27. A valve combination including a valve body having a seat; a fluid operated closure co-acting with said seat, said closure having a by-pass; a gasket detachably mounted on said closure, the mounting means including adjustable regulating means adapted to regulate the flow of fluid through said by-pass; controlling means for said closure including an auxiliary valve and electrical means forming a fluid chamber for controlling the latter.

In testimony whereof, I have hereunto affixed my signature at Los Angeles, California, this 26th day of August, 1925.

EDGAR EARLE LITTLEFIELD.